(12) United States Patent
Busch

(10) Patent No.: US 11,401,873 B2
(45) Date of Patent: Aug. 2, 2022

(54) EMERGENCY VEHICLE THROTTLE MANAGEMENT SYSTEM

(71) Applicant: Bradley Busch, Ocala, FL (US)

(72) Inventor: Bradley Busch, Ocala, FL (US)

( * ) Notice: Subject to any disclaimer, the term of this patent is extended or adjusted under 35 U.S.C. 154(b) by 0 days.

(21) Appl. No.: 17/142,952

(22) Filed: Jan. 6, 2021

(65) Prior Publication Data
US 2021/0215107 A1 Jul. 15, 2021

Related U.S. Application Data

(60) Provisional application No. 63/006,282, filed on Apr. 7, 2020, provisional application No. 62/959,405, filed on Jan. 10, 2020.

(51) Int. Cl.
| | |
|---|---|
| *A62C 27/00* | (2006.01) |
| *F02D 11/10* | (2006.01) |
| *F02D 41/02* | (2006.01) |
| *B60W 10/10* | (2012.01) |
| *B60W 10/06* | (2006.01) |
| *G07C 5/00* | (2006.01) |

(52) U.S. Cl.
CPC ........... *F02D 11/105* (2013.01); *B60W 10/06* (2013.01); *B60W 10/10* (2013.01); *F02D 41/023* (2013.01); *A62C 27/00* (2013.01); *F02D 2250/18* (2013.01); *G07C 5/008* (2013.01)

(58) Field of Classification Search
CPC . B60K 28/063; B60W 2540/24; B60W 10/06; B60W 10/10; G01N 33/4972; F02D 11/105; F02D 41/023; F02D 2250/18; A62C 27/00; G07C 5/008
See application file for complete search history.

(56) References Cited

U.S. PATENT DOCUMENTS

| | | | |
|---|---|---|---|
| 7,341,693 B2* | 3/2008 | Der Ghazarian | A61B 5/083 422/84 |
| 7,987,916 B2* | 8/2011 | Laskaris | A62C 35/026 169/24 |
| 8,555,990 B2* | 10/2013 | Ver Steeg | A62C 27/00 169/24 |
| 9,641,047 B2* | 5/2017 | Collett | H02K 7/1807 |

(Continued)

*Primary Examiner* — Gonzalo Laguarda
(74) *Attorney, Agent, or Firm* — Jason T. Daniel, Esq.; Daniel Law Offices, P.A.

(57) ABSTRACT

An emergency vehicle throttle management system includes a system controller having a main body, a processor, a memory, a multiplex connectivity component, a powertrain connectivity component, and a life safety connectivity component. The life safety connectivity component functioning to communicate directly with one of the life safety systems onboard the emergency vehicle. The powertrain connection component functioning to communicate with the powertrain components of the emergency vehicle which are mechanically coupled to the life safety system. The system controller including functionality for transmitting a powertrain resource request to the powertrain of the emergency vehicle in response to a throttle adjustment request received from the life safety system or a command from the throttle pedal of the vehicle. A throttle rule management unit evaluates error notifications received from the multiplex system, and selectively instructs the throttle source circuit to generate powertrain resource requests.

9 Claims, 5 Drawing Sheets

(56) References Cited

U.S. PATENT DOCUMENTS

| | | | |
|---|---|---|---|
| 10,137,901 B2* | 11/2018 | Jones | B60K 28/063 |
| 10,525,297 B2* | 1/2020 | Kay | G07C 5/0816 |
| 10,995,760 B1* | 5/2021 | Stubbs | H04Q 9/00 |
| 2008/0215190 A1* | 9/2008 | Pillar | B60T 17/221 |
| | | | 701/1 |
| 2010/0294583 A1* | 11/2010 | Biondo | A61B 5/082 |
| | | | 180/272 |
| 2012/0214550 A1* | 8/2012 | Galaro | H04W 88/08 |
| | | | 455/561 |
| 2016/0096053 A1 | 4/2016 | Beechy et al. | |
| 2016/0096054 A1* | 4/2016 | Busch | H04L 67/125 |
| | | | 700/282 |
| 2018/0293818 A1* | 10/2018 | Linsmeier | G06Q 50/28 |

* cited by examiner

EMERGENCY VEHICLE THROTTLE MANAGEMENT SYSTEM

CROSS-REFERENCE TO RELATED APPLICATIONS

This application claims the benefit of U.S. Application Ser. No. 62/959,405 filed on Jan. 10, 2020, and U.S. Application Ser. No. 63/006,282 filed on Apr. 7, 2020, the contents of each of which are incorporated herein by reference.

TECHNICAL FIELD

The present invention relates generally to emergency vehicle systems, and more particularly to a throttle management system for regulating system resource demands and reducing the likelihood of support system failure.

BACKGROUND

The statements in this section merely provide background information related to the present disclosure and may not constitute prior art.

Modern mobile life safety support vehicles such as the Fire Truck 1 illustrated in Background FIG. 1A, for example, transport and power a multitude of complex life safety support systems. Two of the most common life safety support systems found on these vehicles include a fire suppression system 2, and an aerial ladder system 3. Of course, there are many other life safety support systems that may be provided in addition to, or instead of those illustrated, as modern vehicles may be specially built and configured to transport and power many life safety support systems designed to mitigate a wide array of hazardous situations. Several nonlimiting examples include breathing air compression systems, and compressed air foam systems, for example.

In either instance, each of these systems 2 and 3 are independently designed to be function specific, and typically include a plurality of subcomponents 2a-2e, and 3a-3d, respectively, that communicate internally via proprietary networks and communication protocols. For example, the fire suppression system 2 may be used to extinguish a fire exclusive of the aerial implement 3. In the same configuration the aerial implement may be used to rescue a person from a structure that is non-related to fire hazard, leaving the fire suppression system unused. In yet another example both the fire suppression system and the aerial implement may be used conjunctively to mitigate both life rescue and fire suppression operations.

Although these systems work well individually to perform their specific task, the proprietary nature of each system results in the inability for one system to communicate directly with another life safety system on the vehicle. As a result, a multiplexing system 5 provides both the ability for each of these life safety systems to communicate with the mechanical driveline components of the supporting vehicle (e.g., vehicle powertrain 4), and to participate in specific logic for allowing or preventing such operation.

To this end, the Multiplex system includes a programmable logic board 5a that is in communication with a plurality of discrete input/output components 5b and 5c, for example, and system interlocks 5d to ensure that each vehicle system is properly configured before allowing operation of a requested life safety system. For example, the Multiplex system may be programmed to require the vehicle jacks to be extended and for the vehicles emergency lighting to be active before allowing the PTO 4a to disengage the rear axle of the vehicle and connect to one of the life safety systems 2 or 3.

Traditionally, a single auxiliary throttle source with external interlocks allowing specific engine throttle operation has been provided to an operator on a control panel. However, the number of support systems requiring application specific control of powertrain parameters on fire apparatus has increased as emergency vehicles and support equipment continue to advance. As a result, there are times where a fault in one component of the system and/or the vehicle itself prevents the operation of a life safety system. Depending on the specific fault, it may not be possible for on-site personnel to diagnose the issue, thus rendering the vehicle inoperable when it is needed most.

As shown at background FIG. 1B, when the vehicle is configured to operate the fire suppression system, the vehicle PTO 4a will be mechanically linked to the suppression system pump 2c, and the engine/throttle 4d will be controlled by the control station 2d and the governor control subsystem 2e via the multiplex system. In normal operation, the governor control system will communicate with the multiplex system to request engine throttle adjustments, in order to change the pressure of water being pumped by the pump 2c.

However, if one of the multiplex system nodes 5e fails, such as can happen through a shorted wire, for example, the interlocks will not permit new or continued operation of the fire suppression system. As a result, operation of the throttle control would be removed from the governor system, thus disabling operation of the pump 2c and rendering the vehicle down for service. Unfortunately, in such a situation, there would be no way for an on-site operator to diagnose the problem and/or for them to safely bypass the interconnected controls in order to resume operation of the pump in such a situation.

Accordingly, it would be beneficial to provide an Emergency Vehicle Throttle Management System having a system controller that can be communicatively linked to the vehicle powertrain and each of the onboard life safety systems, in order to coordinate the demand on the vehicle powertrain, resolve system conflicts, and/or provide the ability for an on-site user to manually operate the powertrain in order to provide operating power to a needed life safety system.

SUMMARY OF THE INVENTION

The present invention is directed to an emergency vehicle throttle management system. One embodiment of the present invention can include a system controller having a main body, a processor, a memory, a multiplex connectivity component, a powertrain connectivity component, and at least one life safety connectivity component. Each of the at least one life safety connectivity components can function to communicate directly with one of the life safety systems onboard the emergency vehicle. Each component including functionality for communicating with the designated life safety system using the proprietary communication protocol of the system.

The powertrain connection component can function to communicate with the powertrain components of the emergency vehicle, such as the vehicles' engine, transmission, throttle and power take off. The power takeoff being selectively engaged to each of the onboard life safety systems and deriving operating power therefrom.

In one embodiment, the system controller includes functionality for transmitting a powertrain resource request to the powertrain of the emergency vehicle over the vehicle controller area network. The transmitted request can be sent in response to a throttle adjustment request received from one of the life safety systems or in response to a command from the throttle pedal of the vehicle.

Another embodiment of the present invention can include a throttle rule management unit that includes functionality for evaluating error notifications received from the multiplex system, and selectively instructing the throttle source circuit to generate powertrain resource requests.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1A:
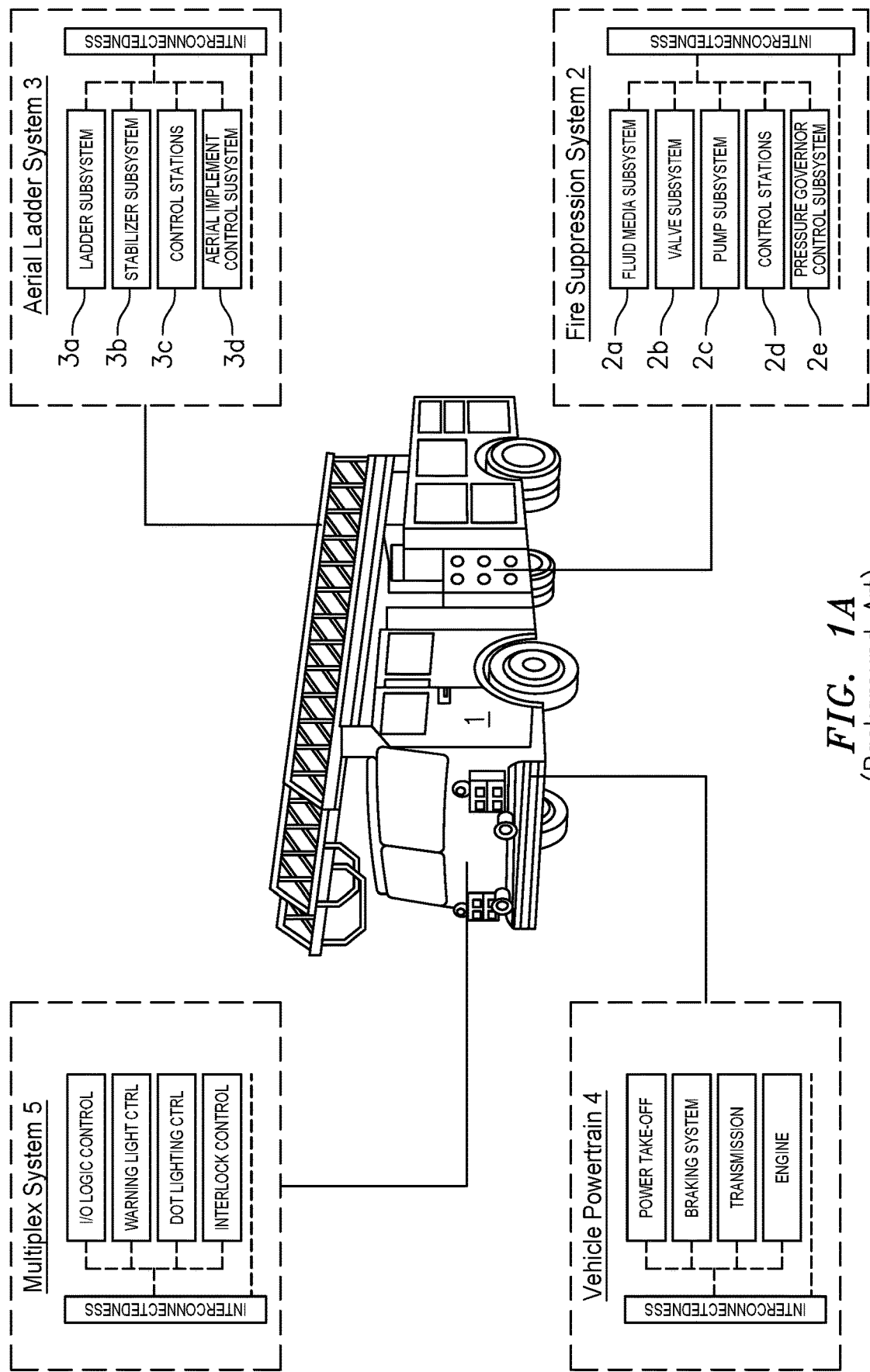
FIG. 1A is an illustrative operating environment of an emergency throttle management system that is useful for understanding the inventive concepts disclosed herein.
Figure 1B:
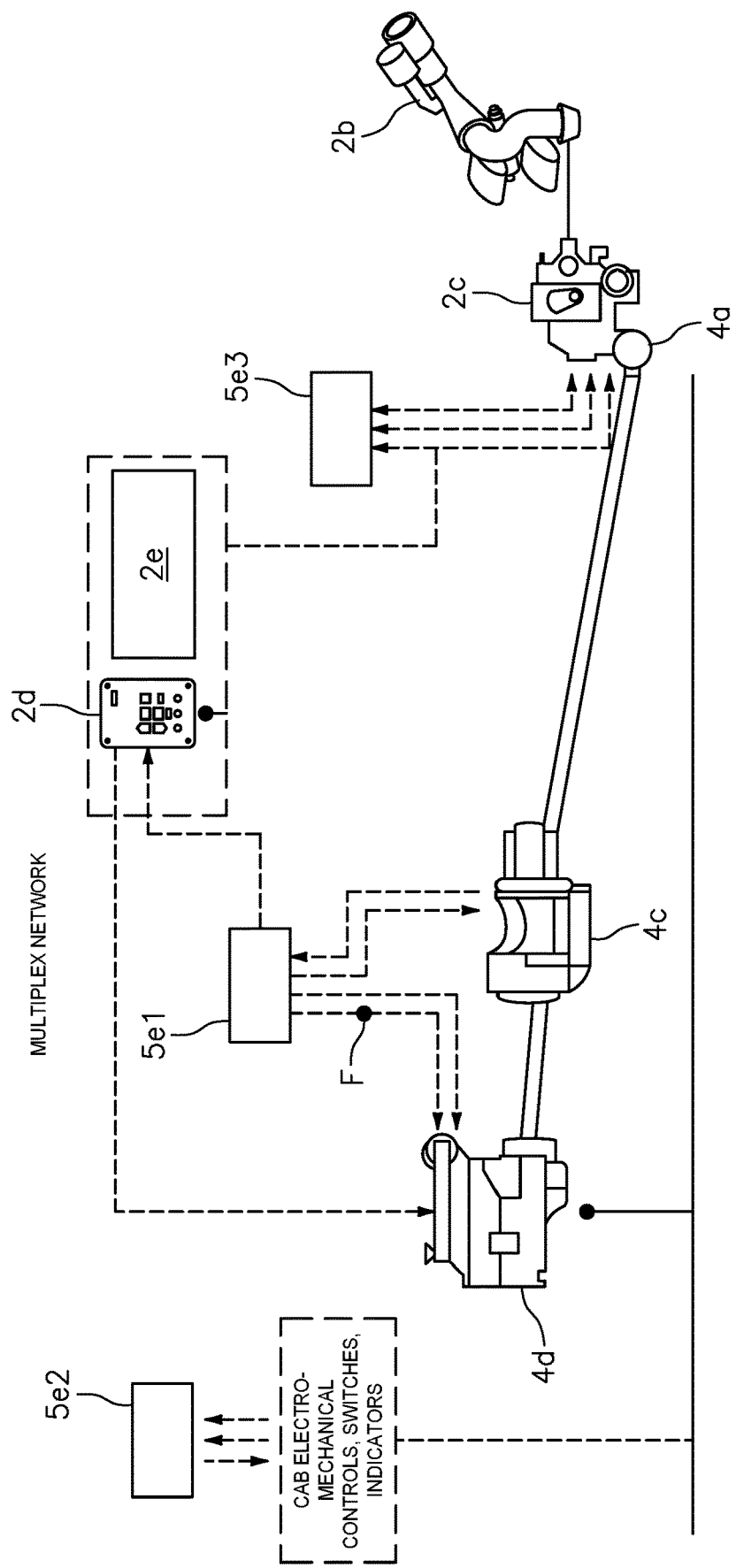
FIG. 1B is a schematic diagram illustrating an operation of the life safety systems of an emergency vehicle, in accordance with the background art.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, a "unit," and a "component" are used interchangeably to describe one or more identified physical objects and/or devices which are linked together and/or function together to perform a specified function.

As described herein, a "powertrain resource request" can include an instruction to initiate, change or stop an operation of a powertrain component such as the engine speed, engine RPM, engine torque, and/or transmission mode/gear, for example.

As described herein, an "error notification" can include a detection by the multiplex system or other life safety system that a system fault exists and/or that a configuration of components is not in the necessary order to allow new or continued operation of a life safety system.

Various embodiments of an emergency vehicle throttle management system 100 are described below for understanding the inventive concepts disclosed herein. In each of the drawings, identical reference numerals are used for like elements of the invention or elements of like function. For the sake of clarity, only those reference numerals are shown in the individual figures which are necessary for the description of the respective figure.

Figure 2:
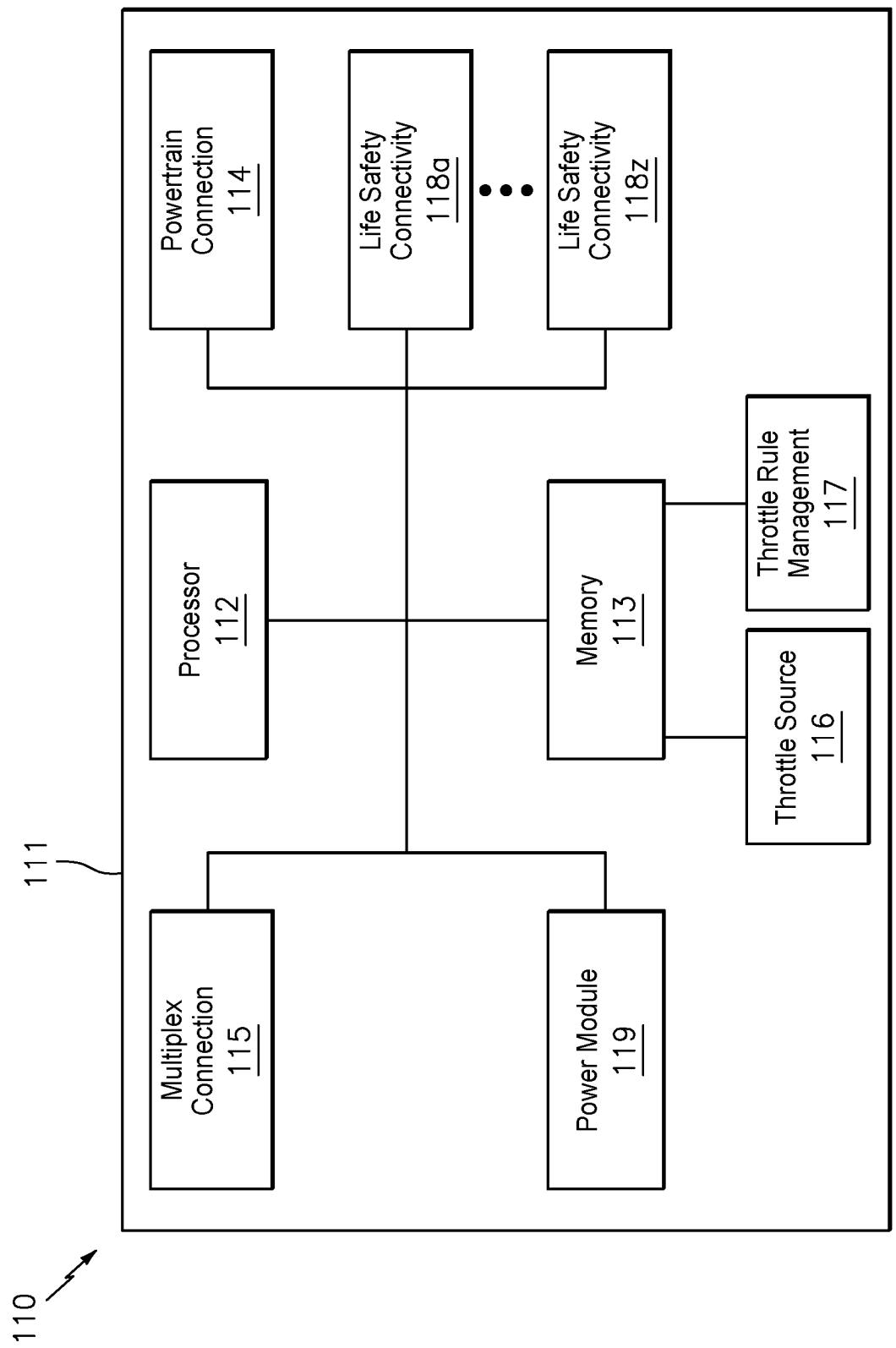
FIG. 2 is a simplified block diagram of the system controller of the emergency vehicle throttle management system, in accordance with one embodiment of the invention.
Figure 3:
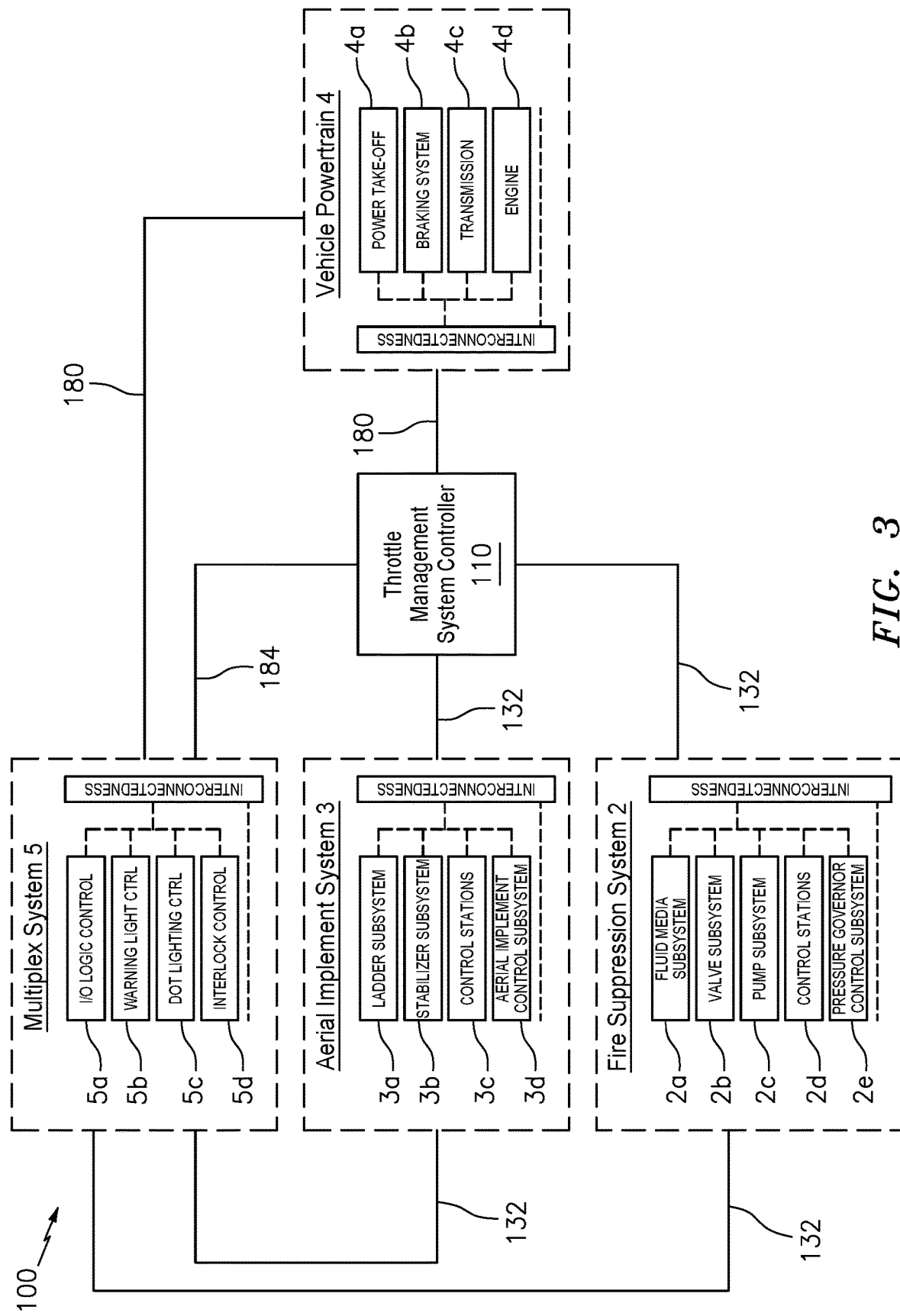
FIG. 3 is a block diagram of the emergency vehicle throttle management system in operation, in accordance with one embodiment of the invention.

FIGS. 2 and 3 illustrate one embodiment of an emergency vehicle throttle management system 100, having a system controller 110 for managing powertrain resource requests, resolving potential system conflicts, and for allowing an on-site operator to selectively engage control of the vehicle powertrain when needed to operate a specific life safety system.

As shown, the controller 110 can include a main body 111 for housing a processor 112 that is conventionally connected to a memory 113, a powertrain connection component 114, a Multiplex communication component 115, an internal throttle source circuit 116, a throttle rule management unit 117, a plurality of life safety connectivity components 118a-118z, and a power module 119.

Although illustrated as separate elements, those of skill in the art will recognize that one or more system controller components may comprise, or include one or more printed circuit boards (PCB) containing any number of integrated circuit or circuits, for completing the activities described herein. Of course, any number of other analog and/or digital components capable of performing the below described functionality can be provided in place of, or in conjunction with the below described controller elements.

The main body 111 can include any number of different shapes and sizes and can be constructed from any number of different materials suitable for encompassing each of the controller elements. In one preferred embodiment, the main body 111 can be constructed from plastic having a plurality of internal connectors (not shown) for securely housing each of the device elements in a compact, shockproof, and watertight manner. Of course, any number of other known construction materials are also contemplated.

The processing unit 112 can be one or more conventional central processing units (CPU) or any other type of device, or multiple devices, capable of manipulating or processing information such as program code stored in the memory 113 and/or the throttle source 116 and throttle rules 117 modules and for causing the circuitry to complete the activities and functionality described herein.

The memory 113 can act to store operating instructions in the form of program code for the processor 112 to execute. Although illustrated in FIG. 3 as a single component, memory 113 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the functionality described below. Additionally, memory 113 can also include one or more cache memories that provide temporary storage of at least some program code in order to reduce the number of times program code must be retrieved from the bulk storage device during execution. Each of these devices are well known in the art.

The powertrain connection component 114 can include circuitry that converts/formats operating instructions from the controller processor into CAN messages for transmission to a designated component and/or ECU of the vehicle powertrain system. To this end, the powertrain connection component can include a Can Bus port, or other such device for receiving a communication cable 180 such as a J1939 Can-Bus data cable that engages the vehicle's Controller Area Network. Of course, any number of other connection ports, cables and/or components are also contemplated.

The multiplex communication component 115 can function to communicatively link the controller 110 to the onboard multiplex system 5, via a command bus 184, for example, to allow the system controller to receive a report indicating the vehicle's current status. As previously noted, the multiplex system 5 captures discrete input/output data from a plurality of nodes/sensors and interlocks positioned along the vehicle. Exemplary data which can be received includes, for example, park/drive/neutral transmission status, parking brake status, suppression fluid status, aerial ladder status, pump switch on/off status and the like. Of course, any number of other connection ports, cables and/or components are also contemplated for allowing one- or two-way communication between the multiplex system 5 and the system controller 110.

The internal throttle source circuit 116 can be provided as a discrete circuit or as a memory component, that includes logic for allowing the controller 110 to send resource requests to the vehicle powertrain system 4. These powertrain resource requests can include, for example, an instruction to engage the vehicle engine which is communicatively linked with a life safety system, and to operate the engine throttle at a set RPM, a set speed, or a set torque, for example, along with ceasing to operate the vehicle engine. The resource requests sent via the circuit 116 can be generated in response to a request for throttle adjustment/control from one of the life safety systems, and/or an on-site user operating an emergency throttle pedal 40 or other such device.

In either instance, such resource commands can function to permit new or continued operation of a life safety system that is mechanically coupled to the vehicle powertrain, despite the presence of a fault or misconfiguration detected by the multiplex system 5 and reported to the communication component 115.

The throttle rule management unit 117 can be provided as a discrete circuit or as a memory component including a predetermined and/or programmable set of rules configured to evaluate and permit a powertrain resource request that is received from one of the life safety systems to be sent to the powertrain via the throttle source circuit 116. To this end, the unit 117 can determine when it is permissible for the internal throttle source circuit 116 to obtain exclusive control of the powertrain system 4 despite the presence of an error notification (e.g., system fault, network fault, and/or configuration error) reported by the multiplex system 5 and/or a contrary instruction from the multiplex system or other life safety system.

The life safety connectivity components 118a-118z can each function to communicate directly with one or more of the onboard life safety systems, such as the illustrated fire suppression system 2 and the aerial implement system 3, via any number of different communication cables 132. To this end, each of the components 118a-118z can include, comprise or consist of any device capable of creating a communications link (e.g., wired and/or wireless, serial communications interfaces, bus connector, etc.) between the system 110 and the life safety systems.

The power module 119 can function to supply the necessary power requirements to each component of the system controller 110. In various embodiments, the power module can include connections for engaging the onboard power supply of the vehicle and/or may include an onboard battery to permit continued operation of the system in the event the connection to the vehicle power is interrupted or unavailable.

In operation, the throttle system controller 110 can be communicatively coupled with each of the vehicle power system 4, the multiplex system 5, and any number of onboard life safety systems 2 and 3, for example, to allow the system controller 110 to selectively control the powertrain system 4 and/or to permit the life safety system to obtain or retain control of the powertrain system even if the multiplex system 5 or one of the other life safety systems reports an error or misconfiguration status.

Figure 4:
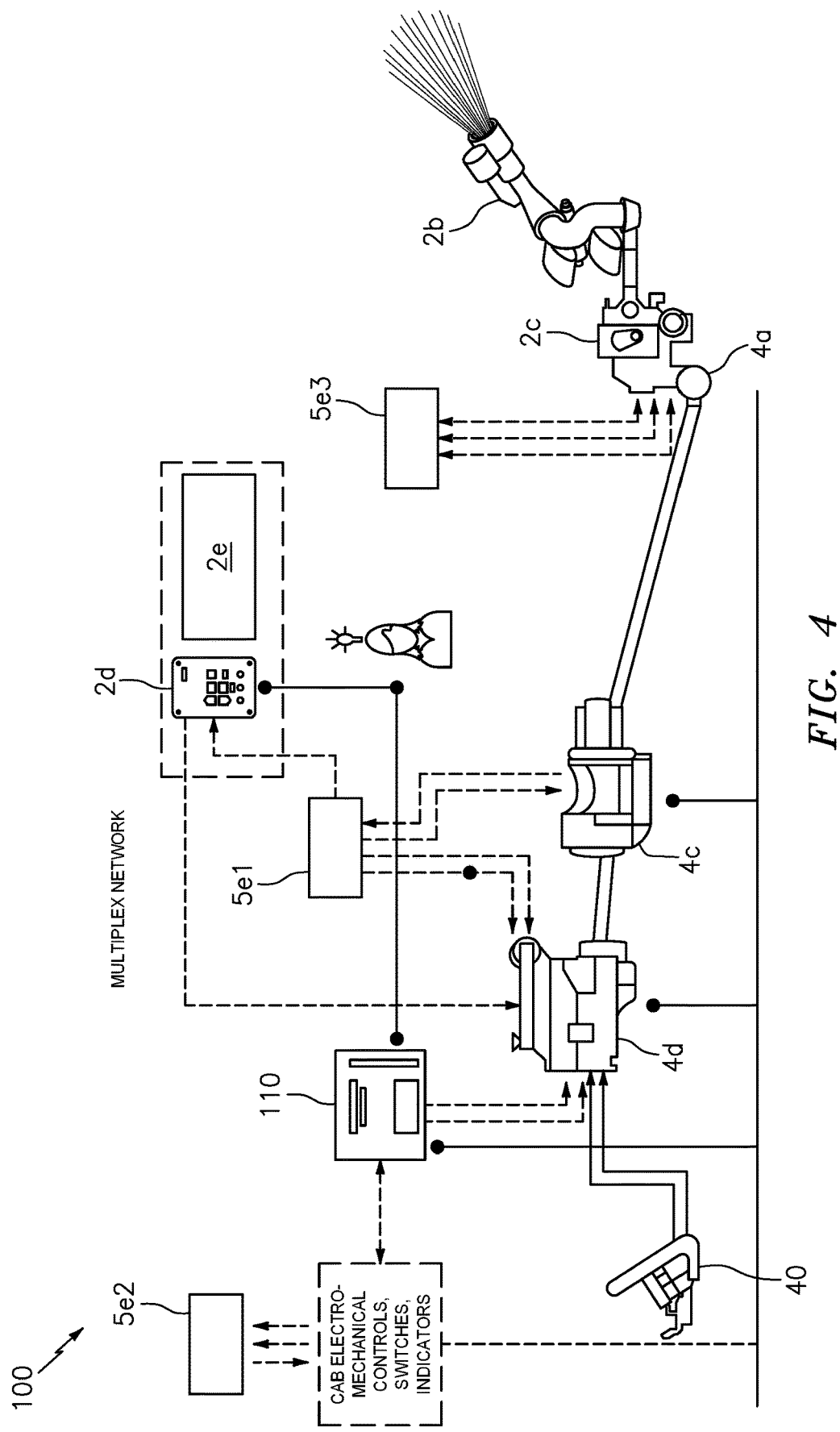
FIG. 4 is a schematic diagram of the emergency vehicle throttle management system in operation, in accordance with one embodiment of the invention.

FIG. 4 schematically illustrates one embodiment of an emergency throttle system 100 and controller 110 in operation. As noted above, when the vehicle is configured to operate the fire suppression system, the vehicle PTO 4a will be mechanically linked to the suppression system pump 2c, and the engine/throttle 4d will be controlled by the control station 2d and the pressure governor control subsystem 2e via the multiplex system.

During this operation, the system controller 110 will continue to monitor all connected systems. In the event that an error is detected, such as a failure of node 5e1, for example, the system controller 110 can selectively take control of the powertrain system, thus preventing the multiplex system 5 from disabling the ongoing operation of the engine 4d and pump 2c that is actively discharging water and/or provide manual override throttle control to a user.

For example, if a specific rule covering the exemplary failure is programmed within the rule management unit 117, the system controller 110 may automatically assume exclusive control of the powertrain system, and may transform and convey throttle adjustment requests from the pressure governor 2e directly to the engine 4d.

In addition to the above, the system 100 can provide options for allowing an on-site user to manually control the powertrain in order to supply operating power to a life safety system. Such a feature being particularly beneficial in instances where a preset rule is not available. In such a situation, a user can instruct the system controller 110 to enable manual control of the engine throttle 4d using the vehicle's throttle (accelerator) pedal 40 and/or foot (service) brake inputs, for example. Upon receiving the user command, the system controller can transform instructions received from the operator pedals and send a powertrain resource request to the engine throttle control 4d feeding the pump 2c.

Although described above with regard to "manual" control, the preferred embodiment of the system controller 110 can employ throttle control logic in order to prevent dangerous changes in water pressure resulting from inadvertent and/or extreme throttle commands. For example, if a user suddenly applies full throttle, the system controller may gradually increase the throttle from zero to the maximum allowable throttle amount over a period of time such as 30 seconds, for example. Likewise, if a user removes their foot from the pedal 40, the system controller 110 can gradually reduce the throttle from the current operating parameter to zero over a period of 5-10 seconds, for example.

The throttle control logic can be provided as a function of the throttle source circuitry and/or the throttle rule management, and represents an important safety feature, as drastic changes in water pressure can cause equipment damage and/or serious injuries or death to firefighters and other users operating hoses and other fire suppression system components.

Although described above with regard to a specific system error, this is for illustrative purposes only, as the system 100 may be configured for allowing the system controller 110 to obtain exclusive control of the powertrain system in any number of different circumstances, and such control may be implemented automatically and/or manually.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module," "unit" or "system." Furthermore, aspects of the present invention may take the form of a computer program product embodied in one or more computer readable medium(s) having computer readable program code embodied thereon.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A throttle management system controller for an emergency vehicle containing a power take off mechanically linking a fire suppression system with a transmission and an engine, wherein the engine is controlled by a control station via a multiplex system, said throttle management system controller comprising:
   at least one life safety connectivity component that is configured to communicate with the fire suppression system;
   a powertrain connection component that is configured to communicate with the engine, the transmission and the power take off; and
   a throttle pedal,
   wherein the throttle management system controller is configured to control the engine after the throttle management system controller receives an error notification from the multiplex system by transmitting a powertrain resource request to the engine of the emergency vehicle, and
   wherein the throttle management system controller is configured to increase throttle over a first period of time after receiving a throttle instruction from the throttle pedal, said first period of time being defined by a consideration of one of damage to equipment mechanically linked to the power take off, or damage to an operator of the equipment mechanically linked to the power take off.

2. The system controller of claim 1, further comprising a multiplex communication component communicatively linked to the multiplex system to allow the throttle management system controller to receive status of the emergency vehicle.

3. The system controller of claim 1, wherein the power resource request transmitted to the engine of the emergency vehicle is based on instructions received from the throttle pedal.

4. The system controller of claim 1, wherein the error notification includes an instruction to disable the engine.

5. The system controller of claim 1, wherein the error notification includes an instruction to disable the fire suppression system.

6. The system controller of claim 1, wherein the error notification is system fault, network fault or configuration error.

7. The system controller of claim 1, wherein the first period of time is 30 seconds.

8. The system controller of claim 1, wherein the throttle management system controller is configured to decrease the throttle over a second period of time after a user's foot is removed from the throttle pedal, said second period of time also being defined by a consideration of one of damage to the equipment mechanically linked to the power take off, or damage to the operator of the equipment mechanically linked to the power take off.

9. The system controller of claim 8, wherein the second period of time is between 5 seconds and 10 seconds.

* * * * *